(12) United States Patent
De Sutter et al.

(10) Patent No.: US 8,122,430 B2
(45) Date of Patent: *Feb. 21, 2012

(54) AUTOMATIC CUSTOMIZATION OF CLASSES

(75) Inventors: Bjorn De Sutter, Ghent (BE); Julian Dolby, Riverdale, NY (US); Frank Tip, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1149 days.

This patent is subject to a terminal disclaimer.

(21) Appl. No.: 11/926,287

(22) Filed: Oct. 29, 2007

(65) Prior Publication Data

US 2008/0082972 A1 Apr. 3, 2008

(51) Int. Cl.
*G06F 9/44* (2006.01)
(52) U.S. Cl. ........ 717/108; 717/116; 717/130; 717/152; 717/154; 717/158
(58) Field of Classification Search ........................ None
See application file for complete search history.

(56) References Cited

U.S. PATENT DOCUMENTS

| | | | | |
|---|---|---|---|---|
| 6,085,035 | A * | 7/2000 | Ungar | 717/116 |
| 6,301,584 | B1 * | 10/2001 | Ranger | 1/1 |
| 6,901,588 | B1 * | 5/2005 | Krapf et al. | 717/164 |
| 7,334,216 | B2 * | 2/2008 | Molina-Moreno et al. | 717/109 |
| 7,356,802 | B2 * | 4/2008 | de Sutter et al. | 717/108 |
| 2002/0111697 | A1 | 8/2002 | Kimelman et al. | |
| 2002/0138819 | A1 * | 9/2002 | Hills | 717/114 |
| 2002/0154551 | A1 | 10/2002 | Kimelman et al. | |
| 2002/0165901 | A1 | 11/2002 | Rajan et al. | |
| 2005/0071810 | A1 * | 3/2005 | Sutter et al. | 717/116 |
| 2005/0149914 | A1 * | 7/2005 | Krapf et al. | 717/136 |
| 2008/0082959 | A1 * | 4/2008 | Fowler | 717/104 |
| 2009/0132995 | A1 * | 5/2009 | Iborra et al. | 717/106 |

OTHER PUBLICATIONS

Schonberg, E., Schwartz, J., Sharir, Micha, An Automatic Technique for Selection of Data Representation in SETL Programs, ACM Transactions on Programming Languages and Systems, vol. 3, No. 2, Apr. 1981, pp. 126-143.

Cai, J., Paige, R. Towards Increased Productivity of Algorithm Implementation, SIGSOFT 1993, pp. 71-78.

Earley, J. High Level Iterators and A Method for Automatically Designing Data Structure Representation, Electronics Research laboratory, College of Engineering, University of California Berkely, 1976, pp. 321-342.

Paige, R. Transformational Programming—Applications to Algorithms and Systems, In Proc. 10th ACM. 1983, pp. 73-87.

(Continued)

*Primary Examiner* — Tuan Dam
*Assistant Examiner* — Zheng Wei
(74) *Attorney, Agent, or Firm* — Jon A. Gibbons; Fleit Gibbons Gutman Bongini & Bianco PL

(57) ABSTRACT

A method and computer readable medium for automatic replacement of object classes in a library with custom classes to improve program efficiency. The method begins with static analysis preformed on a program containing a plurality of objects in order to determine type-correctness constraints and to detect unused functionality in one or more of the objects to be replaced. The plurality of objects is instrumented to detect usage patterns of functionality in one or more objects. Customized classes are generated based upon the static analysis and usage patterns detected. Bytecode is rewritten which is used for generating classes. The present invention provides transparency in the replacement of the objects.

20 Claims, 11 Drawing Sheets

OTHER PUBLICATIONS

Glew, N., Palsberg, J. Type-Safe Method Inlining, In Proc. 16th European Conf. on Object-Oriented Programming (2002), pp. 525-544.

Friedman, S., Leidenfrost, N., Brodie, B., Cytron, R. Hashtables for Embedded and Real-Time Systems, In IEEE Real-Time Embedded System Workshop (2001).

Dewar, R., Grand, A., Liu, S., Schwartz, J. Programming by Refinement, as Exemplified by the SETL Representation Sublanguage, Illinois Institute of Technology, ACM Transactions on Programming Languages and Systems, vol. 1, No. 1, Jul. 1979, pp. 27-49.

Palsberg, J., Schwartzbach, M. Object-Oriented Type Systems, John Wiley & Sons, 1993.

Tip et al., Class Hierarchy Specialization, 1997 ACM, pp. 271-281.

Pauw et al., Visualizing the Execution of Java Programs, Published: 2002 at Software Visualization, LNCS 2269, pp. 151-162.

Sweeney et al., Extracting Library-Based Object-Oriented Applications, Published 2000 ACM, pp. 98-107.

Snelting et al., Understanding Class Hierachies Using Concept Analysis, Published May 2000, ACM Transactions on Programming Languages and System vol. 22, No. 3, pp. 540-582.

* cited by examiner

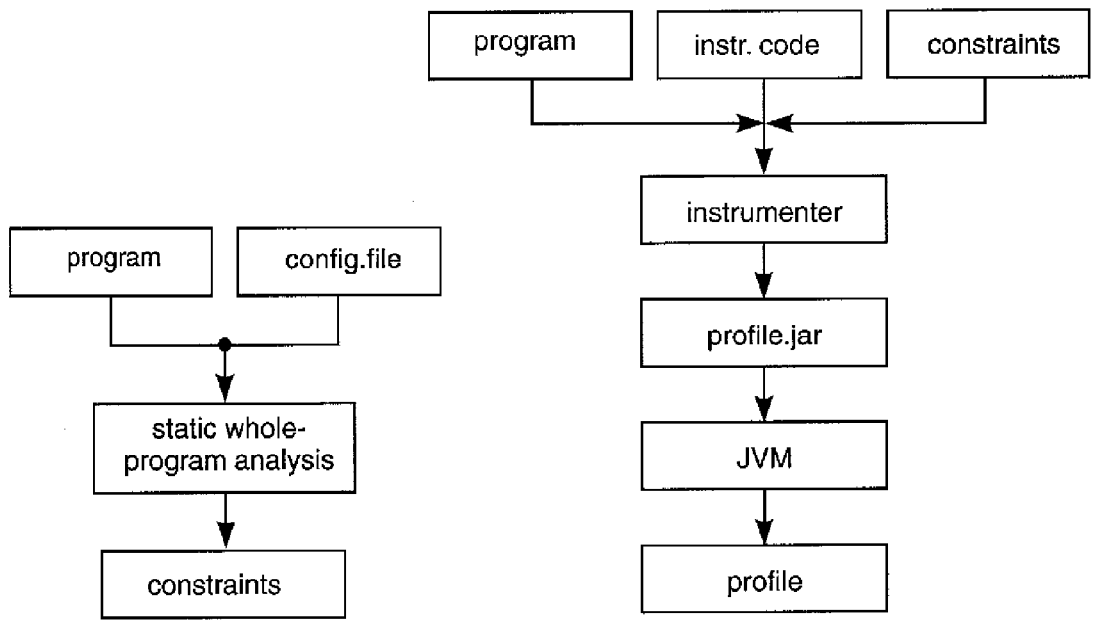
*FIG. 1A*          *FIG. 1B*
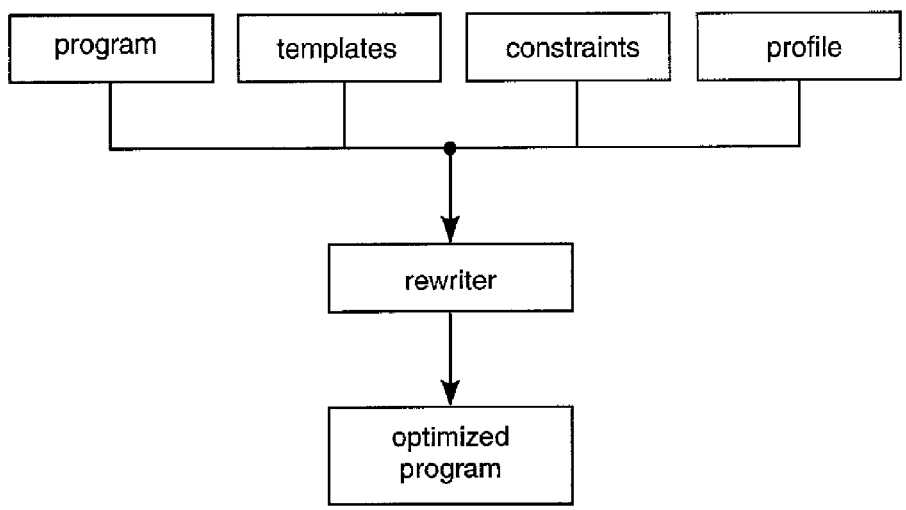
*FIG. 1C*

```
1  public class Example {
2    public static void foo(Map m) {
3      Hashtable h1 = new Hashtable();           /* H1 */
4      JTree tree = new JTree(h1);
5      Hashtable h2 = new Hashtable();           /* H2 */
6      Hashtable h3 = new Hashtable();           /* H3 */
7      bar(h3);
8      h2 = h3;
9      h2.put("FOO", "BAR");
10     h2.putAll(m);
11     Properties p1 = System.getProperties();
12     String s = p1.getProperty("java.class.path");
13     h2 = p1;
14   }
15   public static void bar(Object o) {
16     Hashtable h4 = (Hashtable) o;              /* C1 */
17     if (h4.contains("FOO")) {...}
18   }
19   public static void bad(){
20     String s = new String("bad");              /* S1 */
21     bar(s);
22   }
23 }
```

*FIG. 3A*

```
public class Example {
  public static void foo(Map m) {
    Hashtable h1 = new Hashtable();
    JTree tree = new JTree(h1);
    Map h2 = new CachingHashtable();
    Map h3 = new CachingHashtable();
    bar(h3);
    h2 = h3;
    h2.put("FOO", "BAR");
    h2.putAll(m);
    Properties p1 = System.getProperties();
    String s = p1.getProperty("java.class.path");
    h2 = p1;
  }
  public static void bar(Object o) {
    AbstractCustomHashtable h4 = (AbstractCustomHashtable) o;
    if (h4.contains("FOO")) {...}
  }
  public static void bad() {
    String s = new String("bad");
    bar(s);
  }
}
```

*FIG. 3B*

| | |
|---|---|
| $[E]$ | the type of expression or $E$ |
| $[M]$ | the declared return type of method $M$ |
| $[F]$ | the declared type of .eid $F$ |
| $Decl(M)$ | the type that contains method $M$ |
| $Decl(F)$ | the type that contains .eid $F$ |
| $Param(M, i)$ | the $i$-th formal parameter of method $M$ |
| $T' \leq T$ | $T'$ is equal to $T$, or $T'$ is a subtype of $T$ |
| $T' < T$ | $T'$ is a proper subtype of $T$ (i.e., $T' \leq T$ and not $T \leq T'$) |

*FIG. 4*

| program construct(s)/analysis fact(s) | implied type constraint(s) | |
|---|---|---|
| assignment $E_1 = E_2$ | $[E_2] \leq [E_1]$ | (1) |
| method call $E.m(E_1, \cdots, E_n)$ to a virtual method $M$ | $[E.m(E_1, \cdots, E_n)] \triangleq [M]$ $[E_i] \leq [Param(M,i)]$ $[E] \leq Decl(M_1)$ or $\cdots$ or $[E] \leq Decl(M_k)$ where $RootDefs(M) = \{M_1, \cdots, M_k\}$ | (2) (3) (4) |
| access $E.f$ to field $F$ | $[E.f] \triangleq [F]$ $[E] \leq Decl(F)$ | (5) (6) |
| return $E$ in method $M$ | $[E] \leq [M]$ | (7) |
| constructor call new $C(E_1, \cdots, E_n)$ to constructor $M$ | $[E_i] \leq [Param(M,i)]$ | (8) |
| direct call $E.m(E_1, \cdots, E_n)$ to method $M$ | $[E.m(E_1, \cdots, E_n)] \triangleq [M]$ $[E_i] \leq [Param(M,i)]$ $[E] \leq Decl(M)$ | (9) (10) (11) |
| cast $(C)E$ | $[(C)E] \leq [E]$ if $[E]$ is a class | (12) |
| for every type $T$ | $T \leq$ java.lang.Object $[null] \leq T$ | (13) (14) |
| implicit declaration of this in method $M$ | $[this] \triangleq Decl(M)$ | (15) |
| declaration of method $M$ (declared in type $T$) | $Decl(M) \triangleq T$ | (16) |
| declaration of field $F$ (declared in type $T$) | $Decl(F) \triangleq T$ | (17) |
| explicit declaration of variable or method parameter $T\ v$ | $[v] \triangleq T$ | (18) |
| declaration of method $M$ with return type $T$ | $[M] \triangleq T$ | (19) |
| declaration of field $F$ with type $T$ | $[F] \triangleq T$ | (20) |
| cast $(T)E$ | $[(T)E] \triangleq T$ | (21) |
| expression new $C(E_1, \cdots, E_n)$ | $[\text{new } C(E_1, \cdots, E_n)] \triangleq C$ | (22) |
| $M'$ overrides $M$, $M' \neq M$ | $[Param(M', i)] = [Param(M,i)]$ $[M'] = [M]$ | (23) (24) |
| for each cast expression $(C)E$, and each allocation expression $E' \in PointsTo(P,E)$ such that $[E']_P \leq [(C)E]_P$ | $[E'] \leq [(C)E]$ | (25) |
| for each cast expression $(C)E$, and each allocation expression $E' \in PointsTo(P,E)$ such that $[E']_P \nleq [(C)E]_P$ | $[E'] \nleq [C] = [(C)E]$ | (26) |
| expression $E$ that occurs in the libraries such that $[E]_P = T$ | $[E] = T$ | (27) |
| allocation expression new $C(E_1, \cdots, E_n))$ in the libraries | $[\text{new } C(E_1, \cdots, E_n)] = C$ | (28) |

*FIG. 5*

| program construct(s) / analysis facts | implied type constraint(s) | |
|---|---|---|
| expression new $C(E_1, \cdots, E_n)$<br>$C$ is a customizable class | $[\text{new } C(E_1, \cdots, E_n)] \leq C^\top$<br>$C^\perp \leq [\text{new } C(E_1, \cdots, E_n)]$ | (22)(a)<br>(22)(b) |
| expression new $C(E_1, \cdots, E_n)$<br>$C$ is a non-customizable class | $[\text{new } C(E_1, \cdots, E_n)] \triangleq C$ | (22)(c) |

*FIG. 7*

| line | original constraint | rule |
|---|---|---|
| 3 | $[H1] \leq [h1]$ | (1) |
| 3 | $[H1] \leq \text{Hashtable}^\top$ | (22)(a) |
| 3 | $\text{Hashtable}^\perp \leq [H1]$ | (22)(b) |
| 4 | $[h1] \leq [\text{Param}(JTree.JTree(),1)]$ | (8) |
| 4 | $[\text{Param}(JTree.JTree(),1)] = \text{Hashtable}$ | (27) |
| 5 | $[H2] \leq [h2]$ | (1) |
| 5 | $[H2] \leq \text{Hashtable}^\top$ | (22)(a) |
| 5 | $\text{Hashtable}^\perp \leq [H2]$ | (22)(b) |
| 6 | $[H3] \leq [h3]$ | (1) |
| 6 | $[H3] \leq \text{Hashtable}^\top$ | (22)(a) |
| 6 | $\text{Hashtable}^\perp \leq [H3]$ | (22)(b) |
| 7/15 | $[h3] \leq [o]$ | (10) |
| 8 | $[h3] \leq [h2]$ | (1) |
| 9 | $[h2] \leq \text{Map}$ or $[h2] \leq \text{Dictionary}$ | (4) |
| 10 | $[h2] \leq \text{Map}$ | (4) |
| 11 | $[\text{System.getProperties()}] \leq [p1]$ | (1) |
| 11 | $[\text{System.getProperties()}] = \text{Properties}$ | (27) |
| 12 | $[p1] \leq \text{Properties}$ | (4) |
| 13 | $[p1] \leq [h2]$ | (1) |
| 16 | $[C1] \leq [o]$ | (12) |
| 16 | $[H3] \leq [C1]$ | (25) |
| 16 | $[S1] \npreceq [C1]$ | (26) |
| 16 | $[C1] \leq [h4]$ | (1) |
| 17 | $[h4] \leq \text{Hashtable}^\top$ | (4) |
| 20 | $S1 \leq [s]$ | (1) |
| 20 | $[S1] = \text{String}$ | (27) |
| 21/15 | $[s] \leq [o]$ | (10) |

*FIG. 8A*

| line | original constraint | rule |
|---|---|---|
| 3 | $[H1] \leq [h1]$ | (1) |
| 3 | $[H1] \leq \text{Hashtable}^\top$ | (22)(a) |
| 3 | $\text{Hashtable}^\perp \leq [H1]$ | (22)(b) |
| 4 | $[h1] \leq [\text{Param}(JTree.JTree(),1)]$ | (8) |
| 4 | $[\text{Param}(JTree.JTree(),1)] = \text{Hashtable}$ | (27) |
| 5 | $[H2] \leq [h2]$ | (1) |
| 5 | $[H2] \leq \text{Hashtable}^\top$ | (22)(a) |
| 5 | $\text{Hashtable}^\perp \leq [H2]$ | (22)(b) |
| 6 | $[H3] \leq [h3]$ | (1) |
| 6 | $[H3] \leq \text{Hashtable}^\top$ | (22)(a) |
| 6 | $\text{Hashtable}^\perp \leq [H3]$ | (22)(b) |
| 7/15 | $[h3] \leq [o]$ | (10) |
| 8 | $[h3] \leq [h2]$ | (1) |
|  |  |  |
| 10 | $[h2] \leq \text{Map}$ | (4) |
| 11 | $[\text{System.getProperties()}] \leq [p1]$ | (1) |
| 11 | $[\text{System.getProperties()}] = \text{Properties}$ | (27) |
| 12 | $[p1] \leq \text{Properties}$ | (4) |
| 13 | $[p1] \leq [h2]$ | (1) |
| 16 | $[C1] \leq [o]$ | (12) |
| 16 | $[H3] \leq [C1]$ | (25) |
| 16 | $[C1] \leq \text{Hashtable}^\top$ | (26) |
| 16 | $[C1] \leq [h4]$ | (1) |
| 17 | $[h4] \leq \text{Hashtable}^\top$ | (4) |
| 20 | $S1 \leq [s]$ | (1) |
| 20 | $[S1] = \text{String}$ | (27) |
| 21/15 | $[s] \leq [o]$ | (10) |

*FIG. 8B*

| equivalence class | possible types |
| --- | --- |
| {p1, Properties } | {Properties } |
| {h1 } | {Hashtable } |
| {H1 } | {Hashtable } |
| {h2 } | {Map, Hashtable, CustomHashtable } |
| {H2 } | {Hashtable, CustomHashtable } |
| {h3 } | {Map, Hashtable, CustomHashtable } |
| {H3 } | {Hashtable, CustomHashtable } |
| {h4 } | {Hashtable, CustomHashtable } |
| {C1 } | {Hashtable, CustomHashtable } |
| {o } | {Object } |
| {s } | {String } |

*FIG. 9*

| benchmark | Sun JVM 1.3.1 | | | | | | j9 | | | | | |
|---|---|---|---|---|---|---|---|---|---|---|---|---|
| | time (sec) | | | ratios | | | time (sec) | | | ratios | | |
| | $P_o$ | $P_u$ | $P_c$ | $P_u/P_o$ | $P_c/P_o$ | | $P_o$ | $P_u$ | $P_c$ | $P_u/P_o$ | $P_c/P_o$ | |
| _202_jess | 67.3 | 65.2 | 62.1 | 0.97 | 0.92 | | 51.5 | 51.3 | 48.6 | 1.00 | 0.94 | |
| _209_db | 79.4 | 78.5 | 65.3 | 0.99 | 0.82 | | 68.7 | 66.6 | 67.8 | 0.97 | 0.99 | |
| _218_jack | 83.4 | 83.3 | 76.5 | 1.00 | 0.92 | | 60.0 | 62.5 | 54.7 | 1.04 | 0.91 | |
| hyperJ | 22.5 | 23.7 | 20.7 | 1.05 | 0.92 | | 23.7 | 25.5 | 22.1 | 1.08 | 0.93 | |
| Jax | 25.7 | 25.7 | 24.9 | 1.00 | 0.97 | | 33.3 | 33.5 | 33.2 | 1.00 | 1.00 | |
| PmD | 6.93 | 6.88 | 6.53 | 0.99 | 0.94 | | 5.46 | 5.42 | 5.15 | 0.99 | 0.94 | |

*FIG. 10*

| benchmark | # alloc. | customizations |
|---|---|---|
| _202_jess | 1 HT | F, NI, KS, SE |
| | 1 HT | F, NI, KS, AB |
| | 1 HT | F, NI, KI |
| | 1 HT | F, NI, KS |
| _209_db | 1K V | F, NI, SCL |
| _228_jack | 10 HT | F, NI, AS, SEO |
| | 1K HT | F, NI, AL |
| | 1K HT | F, NI, AL |
| HyperJ | 1 HT | F, SCL |
| | 10K HT | NI, AL, SEO |
| | 10K HT | F, NI, AL |
| Jax | 10K HT | F, NI, AS |
| | 3K HT | F, NI, AS |
| PmD | 10K HM | F, AL |
| | 100K HS | F, NI, AL, SEO |
| | 20K HS | F, NI, AL, SEO |

*FIG. 11*

AUTOMATIC CUSTOMIZATION OF CLASSES

CROSS-REFERENCE TO RELATED APPLICATIONS

This application is based upon and claims priority from prior U.S. patent application Ser. No. 10/673,857, filed on Sep. 29, 2003, now U.S. Pat. No. 7,356,802, the entire disclosure of which is herein incorporated by reference in its entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

The present invention generally relates to the field of programming and more particularly to type constraints, static analysis, profiling and class hierarchy as applied to the customization of container classes for optimized object-oriented programming.

DESCRIPTION OF RELATED ART

The availability of a large library of standardized container classes is an important reason for Java's popularity as a programming language. Collection classes such as Hashtable, LinkedList, and Vector in the java.util.* package improve programmer productivity by allowing programmers to focus on the aspects that are unique to their application without being burdened with the unexciting task of building (and debugging!) standard infrastructure. However, the container classes in java.util.* have been written with some average usage pattern in mind. If the use of a container by a specific application differs substantially from this standard usage pattern envisioned by the library designers, performance may be suboptimal.

An example of unnecessary overhead relates to eager data allocation. Because the standard usage of a container typically assumes a large number of accesses to the objects stored therein, the allocation of auxiliary data structures encapsulated by the container is often performed eagerly. For example, the allocation of a Vector's underlying array is often performed eagerly when the container itself is constructed. This approach has the advantage that the container's access methods can assume that these auxiliary data structures have been allocated. However, as shown in the Evaluation Section below, it is not uncommon for programs to create large numbers of containers that remain empty (or that contain only small numbers of objects). In such cases, lazy allocation is preferable, despite the fact that the access methods become slower because they have to check if the auxiliary data structures have been allocated (and create them if this is not the case).

Another recurring source of unnecessary overhead is the fact that standard container implementations often provide more functionality than what is needed by a particular application. Consider, for example, the fact that most iterators provided by containers such as java.util.Hashtable are implemented to be fail-fast (i.e., an exception occurs when an attempt is made to use an iterator and a concurrent modification of its underlying container is detected). Fail-fast iterators are implemented by keeping track of the "version number" of a container that an iterator is associated with, and updating this version number when the container is modified. This "bookkeeping code" is executed, and space for its data is reserved, regardless of the fact whether or not iterators are used. For container clients that do not use iterators, a customized container without iteration support can improve performance.

The availability of libraries of container classes has significant benefits for programmer productivity, and containers such as java.util.Hashtable and java.util.Vector are used by most Java programs.

The implementations of these containers are typically tuned for some average usage pattern. If the use of a container in a specific application does not match this average pattern, performance may be suboptimal.

Accordingly, a need exists for a method and system to reduce unnecessary overhead in standard container implementations and data allocations as known in the prior art in order to increase performance.

SUMMARY OF THE INVENTION

The present invention overcomes many of the unnecessary overhead problems associated with the prior art by rewriting applications to use customized versions of classes that are automatically generated using a combination of static analysis information and profile information.

The present invention has been benchmarked and evaluated on a set of Java applications, speedups of up to 18 percent have been measured.

One embodiment in the present invention is to automatically generate customized versions of standard java.util.* container classes that are optimized for their usage in a particular application. This involves the following steps:

A static analysis is performed to determine where references to standard container classes can be replaced with references to custom container classes without affecting type correctness or program behavior.

Profile information is gathered to determine the usage characteristics of the created container objects.

Customized container classes are generated, and the application is rewritten to make use of these.

The present invention implemented these techniques as transformations on Java byte codes in a way that is completely transparent to the programmer. These techniques have been applied to a set of benchmark Java applications that make significant use of various standard container classes, and speedups of up to 18% have been measured.

Alternate embodiments of the present invention include the customization of libraries that implement protocols for communication and distributed programming, as well as other domain-specific libraries.

A method and computer readable medium are presented for automatic replacement of object classes in a library with custom classes to improve program efficiency. The method begins with static analysis performed on a program containing a plurality of objects in order to determine constraints on the kinds of transformations that can be applied (e.g., type-correctness constraints) and to detect unused functionality in one or more of the objects to be replaced. The plurality of objects is instrumented to detect usage patterns of functionality in one or more objects. Customized classes are generated based upon the static analysis and usage patterns detected. Bytecode is rewritten which is used for generating classes. The present invention provides transparency in the replacement of the objects.

The method for automatic replacement of object classes, includes:

performing static analysis on a program containing a plurality of objects in order to determine constraints on the transformations that can be applied and to detect unused functionality in one or more of the objects to be replaced;

analyzing the plurality of objects to detect usage patterns of functionality in the one or more objects replaced; and generating customized classes based upon the static analysis and the usage patterns detected.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

FIG. 1 is a schematic overview of the overall approach, according to the present invention in three parts for the customization of a library of classes: FIG. 1A depicts the whole-program analysis steps; FIG. 1B depicts the instrumentation steps and FIG. 1C depicts the steps of customized class generation.

FIGS. 3a and 3b is a section of an example program used to illustrate issues that arise when introducing custom container classes such as those shown in FIG. 2, according to the present invention.

FIG. 4 is a list of the notation used to express type constraints, according to the present invention.

FIG. 5 shows the type constraints that are implied by a number of common Java program constructs, according to the present invention.

FIG. 7 is a list of the revised type constraints for allocation sites and casts, according to the present invention.

FIG. 8($a$) is a list of all non-trivial type constraints for the example program of FIG. 3($a$), according to the present invention.

FIG. 8($b$) is a list of the simplified type constraints for the program of FIG. 3($a$), according to the present invention.

FIG. 9 is a list of the many possible types computed for each equivalence class, according to the present invention.

FIG. 10 is a Table 1 of the execution times of the original programs, using $P_o$ to denote the execution times obtained using standard container classes $P_c$ to denote execution times obtained using customized container classes, and $P_u$ to denote execution times obtained using standard container classes while ignoring construction-time parameters, according to the present invention.

FIG. 11 is a Table 2 of the benchmark programs are listed, which also lists the applied customizations, the execution times of the original programs, according to the present invention.

DETAILED DESCRIPTION OF THE PREFERRED EMBODIMENTS

Figure 2:
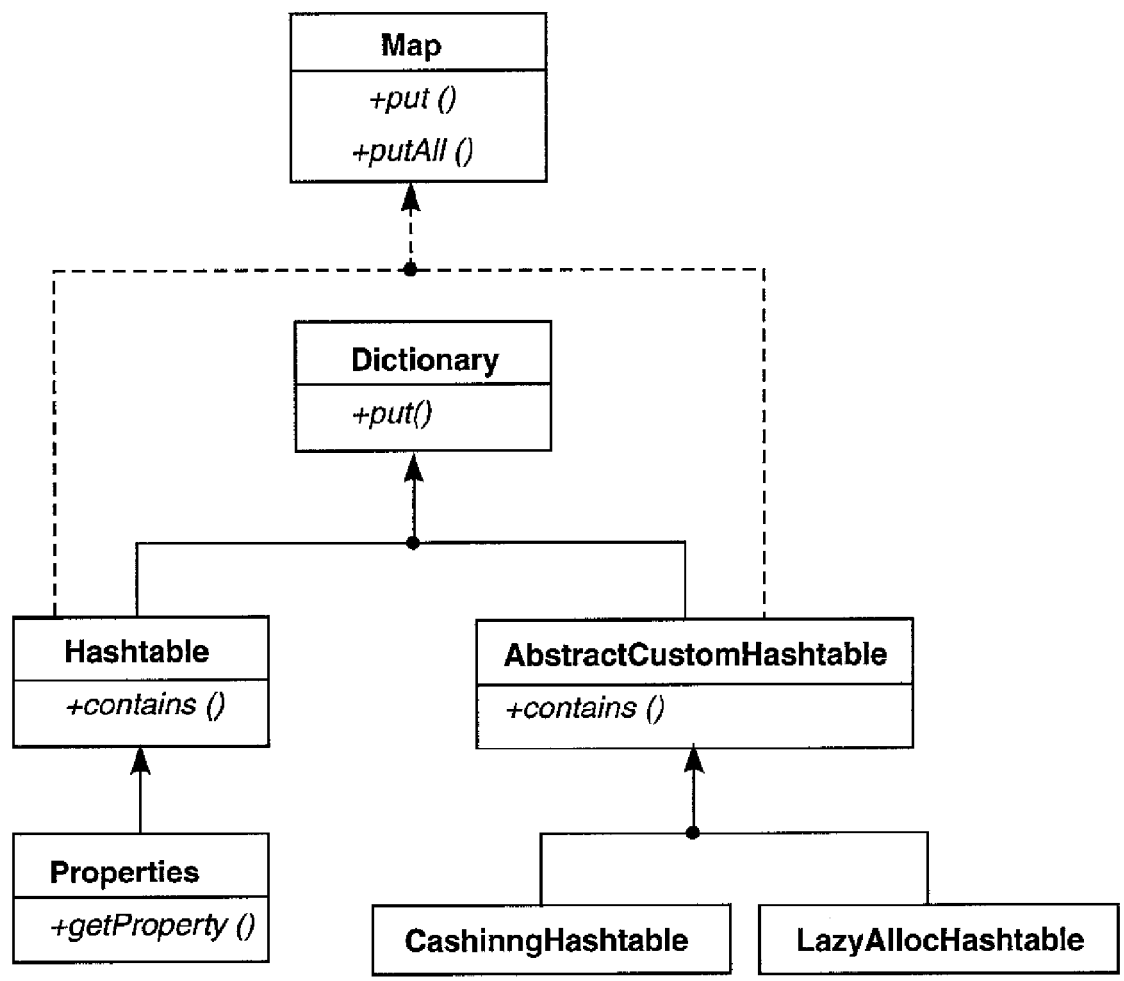
FIG. 2 is a fragment of standard container hierarchy in package java.util.*, according to the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

Overview of Approach

FIG. 1 shows a schematic overview of the present invention in three parts for the customization of a library of classes: FIG. 1A depicts the whole-program analysis steps; FIG. 1B depicts the instrumentation steps and FIG. 1C depicts the steps of customized class generation. The rest of this section will present an overview of each of these steps.

One approach for introducing a customized version of, say, a Hashtable is to create a subclass CustomHashtable that extends Hashtable and that overrides some of Hashtable's behavior. Unfortunately, this approach has significant limitations. In particular, fully lazy allocation is impossible because class Hashtable's constructors always allocate certain auxiliary datastructures (e.g., an array of hash-buckets), and every constructor of CustomHashtable must invoke one of Hashtable's constructors. (While it is possible to specify the initial size of this array of hash-buckets upon construction of a Hashtable-object, the construction of this array-object cannot be avoided altogether if CustomHashtable is a subclass of Hashtable.) A second problem is that a CustomHashtable object would contain all of Hashtable's instance fields, which introduces unnecessary overhead in cases where these fields are unused. The example of iterator-related bookkeeping code discussed above is just one example of this phenomenon.

Therefore, the approach in the present invention is to introduce customized versions of Hashtable in a separate branch of the class hierarchy, as is indicated in FIG. 2. Shown in the FIG. 2 are the standard container types Hashtable, Map, Dictionary, Properties, and the inheritance relationships between them. FIG. 2 also shows customized container classes CachingHashtable and LazyAllocHashtable, as well as an abstract class AbstractCustomHashtable that serves as a common interface to customized versions of Hashtable.

Static Analysis

In cases where an application calls methods in the standard libraries that expect a standard container object such as a Hashtable, or if an application receives standard container objects from the standard libraries, the opportunities for introducing customized containers may be limited. The present invention uses a combination of points-to analysis and type constraints to determine where allocation sites may be updated to refer to custom container classes, and how declarations, casts, and instanceof-expressions can be updated accordingly. (For more general information, please see Rountev, A., Milanova, A., and Ryder, B. Points-to analysis for Java using annotated constraints. In *Proc. 16$^{th}$ Annual*

Conf. on Object-Oriented Programming Systems, Languages, and Applications (OOPSLA '01) (Tampa Bay, Fla., 2001), pp. 43-55; Hind, M., and Pioli, A. Evaluating the effectiveness of pointer alias analysis. *Science of Computer Programming* 39, 1 (2001), 31-55, and, for more information, please see Ryder, B. G. Dimensions of precision in reference analysis of object-oriented programming languages. In *Proc. 12th International Conf. on Compiler Construction (CC 2003)* (Warsaw, Poland, April 2003), pp. 126-137, Palsberg, J. and Schwartzbach, M. *Object-Oriented Tape Systems*. John Wiley & Sons, 1993, and Tip, F., Kiezun, A., and Bäumer, D. Refactoring for generalizations using type constraints. In *Proc. 18th Annual Conf. on Object-Oriented Programming Systems, Languages, and Applications (OOPSLA '03)*, each reference is hereby incorporated by reference in its entirety.)

An example program shown in FIG. 3(*a*) is used to illustrate issues that arise when introducing custom container classes such as those shown in FIG. 2. This program creates a number of container objects, and performs some method calls that involve these objects. Observe that the program contains three allocation sites of type Hashtable and one of type String that will be refer to as H1, H2, H3, and S1, as is indicated in FIG. 3(*a*) using comments. Now the opportunities for replacing allocation sites with custom container types is examined.

Allocation site H1 cannot be updated to allocate a custom hashtable because the objects allocated at H1 are passed to a constructor javax.swing.JTree, a library class that takes an argument of type java.util.Hashtable. Since the code in the standard libraries is not under available, the type of the parameter of JTree's constructor must remain java.util.Hashtable, which implies that the types of h1 and H1 must remain java.util.Hashtable as well. Similar issues arise for calls to library methods whose return type is a (concrete) standard container, such as the call to System.getProperties ( ) on line 11, which returns an object of type java.util.Properties, a subtype of java.util.Hashtable. (In many cases, the use of concrete container types such as Hashtable or Vector (as opposed to abstract container types such as Collection or Map) in the signature of public library methods is an indication of poor design, because it unnecessarily exposes the way in which a library is implemented. Nonetheless, the use of concrete containers in the public API of the standard libraries (as well as in other components) is pervasive. In the JDK 1.3.1 standard libraries, found are 165 public methods that refer to Hashtable, Vector, or Properties in their signature.)

Allocation sites H2 and H3 may be updated to refer to, for example, type CachingHashtable. Assuming that this change is made, h2 and h3 must be updated to refer to a superclass of CachingHashtable (i.e., CachingHashtable, AbstractCustomHashtable, Map, Dictionary, or Object) because the assignments on lines 5 and 6 would otherwise not be type-correct.

The method calls h2.put("FOO", "BAR") and h2.putAll (c) impose the additional requirement that the put( ) and putAll( ) methods must be visible in the type of h2, and hence that h2's type must be CachingHashtable, AbstractCustomHashtable, or Map. Furthermore, the assignment h2=h3 is only type-correct if the type of h2 is the same as or a supertype of the type of h3, and the assignments Properties p1=System.getProperties( ) and h2=p1 imply that the type of h2 must be a supertype of java.util.Properties. Combining all of these requirements, found is that allocation sites H2 and H3 can only be updated to allocate CachingHashtable objects if both h2 and h3 are declared to be of type Map.

The assignment Hashtable h4=(Hashtable) o in method bar( ) presents another interesting case because it uses a cast (indicated as C1 in comments). Observe that only objects allocated at sites H3 and S1 may be bound to parameter o. In the transformed program, the cast expression must succeed and fail in exactly the same cases as before. In this case, if the type of the object allocated at site H3 is changed to CachingHashtable, changing the type of the cast to, for example, AbstractCustomHashtable will preserve the behavior of the cast (it will still succeed when parameter o points to an object allocated at site H3 and it will still fail when o points to an object allocated at site S1). Furthermore, the assignment Hashtable h4=(Hashtable) o is only type-correct if the type of h4 is a supertype of the type referenced in the cast expression, and the method call h4.contains ( . . . ) implies that h4's type must define the contains ( . . . ) method (in other words, h4 must have type AbstractCustomHashtable or a subtype thereof). To conclude from the above discussion, having the cast refer to type AbstractCustomHashtable and declaring h4 to be of type AbstractCustomHashtable is a valid solution. (It is important to note that several other solutions exist in which allocation sites H2 and H3 are customized. For example, one in which variable h4 and cast C1 both receive type CachingHashtable which is within the true scope and spirit of the present invention.) FIG. 3(*b*) shows the resulting program.

Reviewing the above example several points are summarized as follows: The customized program must satisfy interface-compatibility constraints that are due to the exchange of standard container objects with third-party libraries and type-correctness constraints implied by program constructs such as assignments that constrain the types of their subexpressions. Moreover, run-time behavior must be preserved for casts and instanceof operations. Details about the static analyses performed are presented in Section entitled Static Analysis.

Instrumentation and Profiling

In order to determine the usage characteristics of the various objects created by an application, the program is instrumented. This instrumentation involves nothing more than replacing standard classes with customized versions that gather statistics about the number of objects allocated, the number of times each method is called, etc. The instrumented program is then executed on some representative input data and profile information is collected.

It is important to realize that the introduction of instrumented container classes into a program is subject to the same constraints as the ones discussed in the previous subsection. In other words, gathered is the profile information about container objects that can be actually modified.

Code Generation and Customization

In the present invention, static analysis information is used to determine where custom classes can be introduced, and profile information is used to determine where it is likely to be profitable to introduce a custom container class. The profile information gathered includes: the number of objects allocated at allocation sites, the sizes of allocated objects, hit/miss ratios of search operations, and hit rates of several caching schemes. A combination of static analysis information and points-to information is used to drive several optimizations such as lazy allocation, caching of the last retrieved item, selecting non-default initial sizes and growth strategies, optimizing access operations for situations where containers often remain empty, and several others. Many of these optimization choices are orthogonal, leading to a combinatorial explosion in the number of custom classes that one could use. For example, given 8 completely independent optimization choices, one could create $2^8$=256 different custom versions of Hashtable, 256 different Hashmaps, and so on. Clearly, it is not feasible to distribute all these versions along with an application. Therefore, the present invention uses the approach is to generate customized classes from a template. A bytecode instrumentation tool is used to update the class files for the application to make use of these generated custom container classes. Details about instrumentation, profiling, making optimization decisions, and code generation, are presented in Section Implementation.

Static Analysis

A combination of points-to analysis and constraints is used to determine where references to standard container classes in allocation sites, declarations, casts and instanceof-expressions may be modified to refer to custom container classes instead. (For more general information, please see Rountev, A., Milanova, A., and Ryder, B. Points-to analysis for Java using annotated constraints. In *Proc. 16th Annual Conf. on Object-Oriented Programming Systems, Languages, and Applications (OOPSLA '01)* (Tampa Bay, Fla., 2001), pp. 43-55; Hind, M., and Pioli, A. Evaluating the effectiveness of pointer alias analysis. *Science of Computer Programming* 39, 1(2001), 31-55, and, for more information, please see Ryder, B. G. Dimensions of precision in reference analysis of object-oriented programming languages. In *Proc. 12th International Conf. on Compiler Construction (CC* 2003) (Warsaw, Poland, April 2003), pp. 126-137, (For more information, please see Palsberg, J. and Schwartzbach, M. *Object-Oriented Tape Systems*. John Wiley & Sons, 1993, and Tip, F., Kieżun, A., and Bäumer, D. Refactoring for generalizations using type constraints. In *Proc. 18th Annual Conf. on Object-Oriented Programming Systems, Languages, and Applications (OOPSLA '03)*, each reference is hereby incorporated by reference in its entirety.) In the present invention, the analysis is designed to take into account all necessary interface-compatibility, type-correctness and run-time behavior preservation requirements, as introduced in Section above Static Analysis.

In the remainder of embodiment, an assumption is made that the original program is type-correct. Moreover, the original program is presumed not to contain any up-casts (i.e., casts (C) E in which the type of expression E is a subclass of C). This latter assumption is not a restriction, as there is no need for up-casts in Java byte code. (In Java source code, up-casts are sometimes needed for explicit resolution of overloaded methods.)

Notation and Terminology

Following, the term declaration element is used to refer to declarations of local variables, parameters in static, instance, and constructor methods, fields, and method return types, and to type references in cast expressions. In what follows, v,v' denote variables, M,M' denote methods, F,F' denote fields, C,C' denote classes, I,I' denote interfaces, and T,T' denote types. (In the present invention, the term type will denote a class or an interface). (For more information, please see Tip, F., Kieżun, A., and Bäumer, D. Refactoring for generalizations using type constraints. In *Proc. 18th Annual Conf. on Object-Oriented Programming Systems, Languages, and Applications (OOPSLA '03)*, each reference is hereby incorporated by reference in its entirety.) It is important to note that the symbol M denotes a method together with all its signature and return type information and the reference to its declaring type. Similarly, F and C denote a field and a type, respectively, together with its name, type in which it is declared and, in the case of fields, its declared type.

Moreover, the notation E,E' is used to denote an expression or declaration element at a specific point in the program, corresponding to a specific node in the program's abstract syntax tree. In the present invention an assumption is made that type information about expressions and declaration elements is available from the compiler.

A method M is virtual if M is not a constructor, M is not private and M is not static.

Definition 3.1 defines the concept of overriding for virtual methods. (Note that, according to Definition 3.1, a virtual method overrides itself).

Definition 3.1 (OVERRIDING) A virtual method M in type C overrides a virtual method M' in type B if M and M' have identical signatures and C is equal to B or C is a subtype of B. In this case, M' is overridden by M.

Definition 3.2 below defines, for a given method M, the set RootDefs(M) of methods M' that are overridden by M that do not override any methods except for themselves. Since it is assumed the original program to be type-correct, this set is guaranteed to be non-empty. For example, in the standard collection hierarchy, RootDefs (Hashtable.put( ))={Map.put( ),Dictionary.put( )} because Map and Dictionary are the most general types that declare put( ) methods that are overridden by Hashtable.put( ).

Def. 3.2 (ROOTDEFS) Let M be a method. Define: RootDefs(M)={M'|M overrides M', and there exists no M" (M"≠M') such that M' overrides M}"

Needed for each reference-typed expression E is a conservative and safe approximation of the set of objects that it may point to in some execution of P. Any of several existing algorithms can be used to compute this information, and no assumptions about the particular algorithm used to compute points-to information is made. (For more general information, please see Rountev, A., Milanova, A., and Ryder, B. Points-to analysis for Java using annotated constraints. In *Proc. 16th Annual Conf. on Object-Oriented Programming Systems, Languages, and Applications (OOPSLA '01)* (Tampa Bay, Fla., 2001), pp. 43-55; Hind, M., and Pioli, A. Evaluating the effectiveness of pointer alias analysis. *Science of Computer Programming* 39, 1 (2001), 31-55, and, for more information, please see Ryder, B. G. Dimensions of precision in reference analysis of object-oriented programming languages. In *Proc. 12th International Conf. on Compiler Construction (CC* 2003) (Warsaw, Poland, April 2003), pp. 126-137, each reference is hereby incorporated by reference in its entirety.) Definition 3.3. below defines PointsTo(P,E) to be the set of objects (identified by their allocation sites) that an expression E may point to.

DEF. 3.3 (POINTS-TO SETS) Let P be a program, and let E be an expression in P. Then, PointsTo(P,E) will denote the set of allocation sites $E_1, \downarrow E_n$ at which objects are allocated that E may point to, in some execution of P.

Example 3.4 For example program $P_1$ of FIG. 3a, the following points-to information can be computed using a variation on the flow-insensitive, context-insensitive O-CFA algorithm that propagates allocation sites rather than types.

PointsTo($P_1$, h1)={H1}
PointsTo($P_1$, h2)={H1, H3, P1}
PointsTo($P_1$, h3)={H3}
PointsTo($P_1$, h4)={H3}
PointsTo($P_1$, o)={H3, S1}
PointsTo($P_1$, p)={P1}
PointsTo($P_1$, s)={S1}

(For more general information, please see Palsberg, J. Type-based analysis and applications. In Proc. ACM Workshop on Program Analysis for Software Tools and Engineering (PASTE'01) (Snowbird, Utah, 2001), pp. 20-27, each reference is hereby incorporated by reference in its entirety.)

Here, P1 represents the allocation site(s) at which the Properties objects returned by System.getProperties( ) are allocated.

Type Constraints

As a first step towards demonstrating that customization preserves program behavior, the customized program is type-correct must be ensured. To do so, an existing framework of type constraints is relied on. (For more information, please see Palsberg, J. and Schwartzbach, M. *Object-Oriented Tape Systems*. John Wiley & Sons, 1993, and Tip, F., Kieżun, A., and Bäumer, D. Refactoring for generalizations using type constraints. In *Proc. 18th Annual Conf. on Object-Oriented Programming Systems, Languages, and Applications (OOPSLA '03)*, which is hereby incorporated by reference in its entirety.) For each program construct, one or more type constraints express the subtype-relationships that must exist between the declared types of the construct's constituent expressions, in order for that program construct to be type-correct. By definition, a program is type-correct if the type constraints for all constructs in that program are satisfied.

FIG. 4 shows the notation that will be used to express type constraints. A constraint variable $\alpha$ is one of the following: C (a type constant), [E] (representing the type of an expression or declaration element E), Decl(M) (representing the type in which method M is declared), or Decl(F) (representing the type in which field F is declared). A type constraint is a relationship between two or more constraint variables that must hold in order for a program to be type-correct. In the present invention, a type constraint has one of the following forms: (i) $\alpha_1 \doteq \alpha_2$, indicating that $\alpha_1$ is defined to be the same as $\alpha_2$ (ii) $\alpha_1 \leq \alpha_2$, indicating that $\alpha_1$ must be equal to or be a subtype of $\alpha_2$, (iii) $\alpha_1 = \alpha_2$, indicating that $\alpha_1 \leq \alpha_2$ and $\alpha_2 \leq \alpha_1$, (iv) $\alpha_1 \lneq \alpha_2$, indicating that $\alpha_1 \leq \alpha_2$ but not $\alpha_2 \leq \alpha_1$, (v) $\alpha_1^L \leq \alpha_1^R$ or ... or $\alpha_k^L \leq \alpha_k^R$, indicating that $\alpha_j^L \leq \alpha_j^R$ must hold for at least one j, $1 \leq j \leq k$.

In discussions about types of expressions and subtype-relationships that occur in a specific program P, the notation of FIG. 4 with subscript P. For example, $[E]_P$ denotes the type of expression E in program P, $Decl_P(M)$ denotes the declared return type of method M in program P, $Decl_P(F)$ denotes the declared type of field F in program P, and $T' \leq_P T$ denotes a subtype-relationship that occurs in program P is used. In cases where the program under consideration is unambiguous, these P-subscripts are omitted.

Type-Correctness Constraints

Rules (1)-(17) in FIG. 5 shows the type constraints that are implied by a number of common Java program constructs. For example, constraint Constraint (1) states that an assignment $E_1 = E_2$ is type correct if the type of $E_2$ is the same as or a subtype of the type of $E_1$.

For a virtual method call E.m ($E_{-1}, \ldots, E_{-n}$) that statically resolves to a method M, the type of the call-expression to be the same as M's return type (rule (2)) is defined, and the type of each actual parameter $E_i$ must be the same as or a subtype of the type of the corresponding formal parameter Param(M, i) (rule (3)). Moreover, a declaration of a method with the same signature as M must occur in a supertype of the type of E. This latter fact is expressed in rule (4) using Definition 3.2 by way of an or-constraint. For cast expressions of the form (C)E, rule (21) defines the type of the cast to be C. Moreover, rule(12) states the requirement that the type of E must be a supertype of C. this constraint for cast-expressions reads $[E] \leq [(C)E]$ or $[(C)E] \leq E$. (For more information, please see Tip, F., Kieżun, A., and Bäumer, D. Refactoring for generalizations using type constraints. In *Proc. 18th Annual Conf. on Object-Oriented Programming Systems, Languages, and Applications (OOPSLA '03)*, each reference is hereby incorporated by reference in its entirety.) A simplified version is used here because of the assumption that the original program does not contain up-casts.)

Rules (18)-(22) define the types of variables, parameters, fields, method return types, casts, and allocation sites in the original program.

Behavior-Preserving Constraints

The type constraints discussed thus far are only concerned with type-correctness. In general, additional constraints must be imposed to ensure that program behavior is preserved. Rules (23) and (24) state that overriding relationships that occur in the original program P must also occur in the rewritten program P'. Rules (25) and (26) state that the execution behavior of a cast (C) E must be the same in programs P and P'. Rule (25) ensures that for each E' in the points-to set of E for which the cast succeeds, the cast will still succeed in P'. Likewise, Rule (26) states that for each E' in the points-to set of E for which the cast fails, the cast will still fail in P'.

Interface-Compatibility Constraints

Finally, the customized program preserves interface-compatibility must be ensured. To this end, the additional constraints of rules (27)-(28) in FIG. 5 are imposed. These rules state that the types of declarations and allocation sites that occur in external class libraries must not be changed, respectively.

Extending the Class Hierarchy

Before computing type constraints, the class hierarchy of the original program is extended with the custom container classes. Adding these classes does not affect program behavior because no objects of these types are created and no declarations refer to these classes. In addition to the custom container classes themselves, some auxiliary types are added. The purpose of adding these types prior to the construction of the constraints is that it allows one to infer from the constraints where custom container classes may be introduced in an application. Specifically, the original class hierarchy is extended as follows:

For each customizable container C with superclass B, a class CustomC is created that contains methods and fields that are identical to those in C. If B is not customizable, then CustomC's superclass is B, otherwise it is CustomB.

For each customizable container C, a type $C^T$ is introduced, and both C and CustomC are made a subtype of $C^T$. Type $C^T$ contains declarations of all methods in C that are not declared in any superclass of C.

For each customizable container C, a type $C^\perp$ is introduced, and $C^\perp$ is made a subclass of both C and CustomC. Type $C^\perp$ contains no methods.

Multiple inheritance is used because it allows one to express that the type of an allocation site E should be either C- or CustomC by way of subtype-constraints $[E] \leq C^\perp$ and $C^\perp \leq [E]$. These multiple inheritance relations are only used during the solving of the type constraints and the customized program constructed does not refer to these types.

Section 3.7 describes how the CustomC classes can be further transformed, and turned into a separate class hierarchy such as the one shown earlier in FIG. 2.

Figure 6:
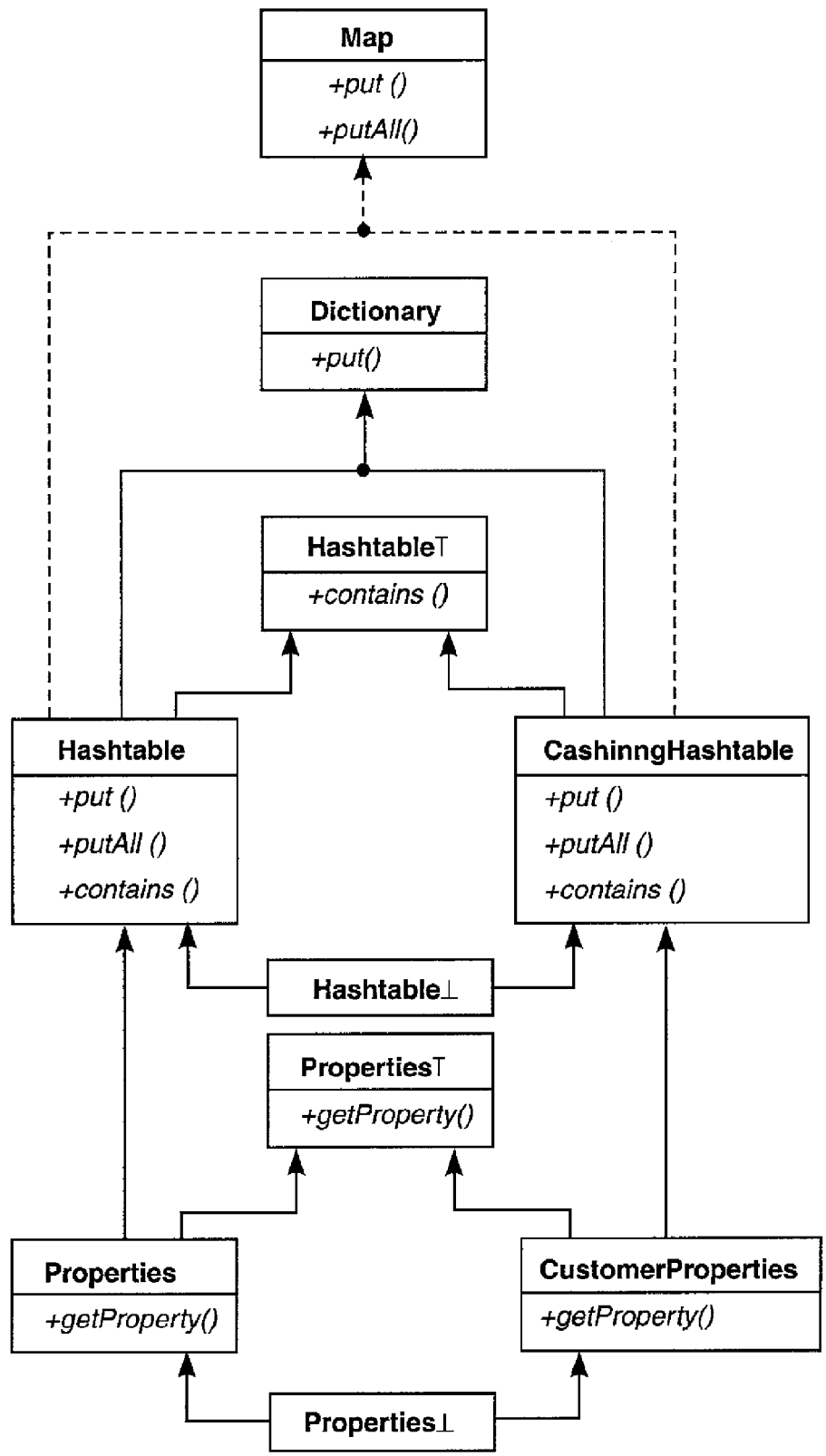
FIG. 6 is a hierarchy diagram for the example program of FIG. 3a after extending it with classes CustomHashtable and CustomProperties, and with additional types Hashtable$^T$, Hashtable$^\perp$, Properties$^T$ and Properties$^\perp$, according to the present invention.

Example 3.5 FIG. 6 shows the hierarchy for the example program of FIG. 3a after extending it with classes CustomHashtable and CustomProperties, and with additional types $Hashtable^T$, $Hashtable^\perp$, $Properties^T$ and $Properties^\perp$.

Restricting the Types of Allocation Sites

The original program always allocates an object of type C at an allocation site new C($E_1 \ldots, E_n$), as was reflected by rule (22) in FIG. 5. In the transformed program, solutions are allowed where the allocated object is either of type C or of type CustomC. To this end, rule (22) is replaced with rules (22)(a)-(22)(c) shown in FIG. 7.

Example 3.6 FIG. 8(a) shows all non-trivial type constraints for the example program of FIG. 3(a). For convenience, each constraint in FIG. 8(a) is annotated with the line number(s) in the source code from which it was derived, and with the number of the rule(s) in FIG. 5 responsible for the creation of the constraint.

Constraint Simplification

In order to simplify the process of constraint solving, a step is first preformed in which all constraints are reduced to the simple forms $[x] \leq [y]$, $[x]=[y]$, and $[x] \triangleq [y]$. This means that constraints of the forms $[E] \leq C_1$ or ... or $[E] \leq C_k$ and $[E'] \leq [(C) E]$ generated using rules (4) and (26) have to be rewritten to the preferred forms.

Simplification of or-Constraints

A virtual method call $E.m(E_1, \ldots, E_n)$ to a method M gives rise to an or-constraint $[E] \leq C_1$ or ... or $[E] \leq C_k$ if [E] has multiple supertypes $C_1, \ldots, C_k$ in which method m( ... ) is declared such that there is not a single method M that is overridden by all $C_i.m(\ldots)$, for all i, $1 \leq i \leq k$.

The approach in the present invention will be to replace the entire or-constraint by one of its branches $[E] \leq C_j$, for some j, $1 \leq j \leq k$. Note that by imposing a stronger constraint on [E], the number of solutions of the constraint system is potentially reduced. Nevertheless, at least one solution is guaranteed to exist: The original program fulfills each of the components of the original or-constraint (Note that the introduction of types $C^T$ and $C^\perp$ does not affect this property, as they do not give rise to additional or constraints.) Hence, it will meet the simplified constraint as well.

Still, choosing the single $\leq$ constraint to replace the disjunction needs some consideration. Consider the constraint:

[h2]≤Map or [h2]≤Dictionary that was generated due to the call h2.put("FOO", "BAR") in the example program of FIG. 3(a). If this constraint is simplified to:

[h2]≤Dictionary

A constraint system is built in which variable h2 must be a subtype of both Map and Dictionary, as well as a supertype of java.util.Properties is. This implies that h2's type must be a subtype java.util.Hashtable, which, in turn, requires that allocation sites H2 and H3 must remain of type java.util.Hashtable, preventing us from customizing these allocation sites.

On the other hand, replacing the or constraint with:

[h2]≤Map allows one to infer the solution shown earlier in FIG. 3(b), in which allocation sites H2 and H3 have been customized. Clearly, some choices for simplifying or-constraints are better than others.

The following approach is used for the simplification of or-constraints. First, any constraint $[x] \leq C_1$ or ... or $[x] \leq C_n$ for which there already exists another constraint $[x] \leq C_j$ can simply be removed, as the latter constraint implies the former. Second, the heuristic is used that any constraint $[x] \leq C_1$ or ... or $[x] \leq C_n$, for which there exists another constraint $[y] \leq C_j$, for some unique j ($1 \leq j \leq n$) such that PointsTo(P,x)∩PointsTo(P,y)≠⇔ is simplified to $[x] \leq C_j$. If no constraint $[y] \leq C_j$ exists, the or-constraint is simplified by making an arbitrary choice. (The results of this approach have been satisfactory so far. If the loss of precision becomes a problem, one could compute the results obtained for all possible choices for each or-constraint, and select a maximal solution.)

Example 3.7 For the type constraint [h2]≤Map or [h2]≤Dictionary in FIG. 8, there already exists another, stronger constraint [h2]≤Map. Therefore, this or-constraint can simply be eliminated.

Simplification of % Constraints

Constraints of the form $[E'] \% [(C)E]$ are introduced by rule (25) in order to preserve the behavior of casts that may fail. For example, in the program of FIG. 3 the cast on line 14 fails when method bar( ) is called from method bad( ), because in this case o will point to a String-object that was allocated at allocation site S1.

The approach in the present invention will be to introduce additional constraints that are sufficient to imply the %-constraint. Specifically, for each cast (C)E for which the points-to set PointsTo(P,E) contains an object o such that $[o]_P \% C$, the following constraint is introduced:

$[(C)E] \leq C^T$

It is easy to see that adding these constraints ensures that the behavior of failing casts is preserved. Suppose that (C)E is a cast that may fail. Then, there exists an E'∈PointsTo(P,E) such that $[E']_P \% C$ Since program P does not create any custom container objects, then $[E']_P \% C \setminus$, $[E']_P \%$ CustomC, and therefore also that $[E']_P \% C^T$.

Hence, imposing the constraint that $[(C)E] \leq C^T$, implies that the type constraint $[E'] \% [(C)E]$ is satisfied in program P'.

Example 3.8 FIG. 8(b) shows the simplified type constraints for the program of FIG. 3(a)

Solving the Constraints

Now that all constraints are of the forms $E \leq E'$, $E=E'$, and $E \triangleq E'$ solving these is straightforward. First, a set of equivalence classes of declaration elements and expressions is created that must have exactly the same type, and the $\leq$ relationship is extended to equivalence classes in the obvious manner.

The set of possible types is computed for each equivalence class using an optimistic algorithm. This algorithm associates a set $S_E$ of types with each equivalence class E, which is initialized as follows:

A set $S_E$ that is associated with an equivalence class that contains an allocation site expression E=new C is initialized with the types C and CustomC.

A set $S_E$ that is associated with an equivalence class that does not contain any allocation site expressions is initialized with all types except the auxiliary types $C^T$ and $C^\perp$.

Then, in the iterative phase of the algorithm, the following steps are performed repeatedly until a fixed point is reached:

For each pair of equivalence classes D, E such that there exists a type constraint $D \leq E$, $S_D$ is removed from any type that is not a subtype of a type that occurs in $S_E$.

For each pair of equivalence classes D, E such that there exists a type constraint $D \leq E$, $S_E$ is removed any type that is not a supertype of a type that occurs in $S_E$.

Termination of this algorithm is ensured because each iteration decreases the number of elements in at least one set, and there is a finite number of sets. Each equivalence class will contain at least the type that is associated with its elements in the original program.

FIG. 9 shows the sets of types computed for each of the equivalence classes in the example. The interpretation of these sets of types requires some remarks:

FIG. 9 depicts many possible solutions. In each solution, a single type in $S_E$ is chosen for each equivalence class E.

If type T occurs in $S^E$, then at least one solution to the constraints exists in which the elements in E have type T.

Selecting types for different equivalence classes can in general not be done independently because the equivalence classes are related by the constraints. For any given pair of equivalence classes D and E one cannot, in general, choose an arbitrary element in $S^D$ for equivalence class D, and an arbitrary element in $S_E$ for equivalence class E.

The previous observation particularly applies to two equivalence classes associated with allocation sites $A_1$ and $A_2$. Selecting type C for (the equivalence class containing) $A_1$ may prevent us from selecting type CustomC for (the equivalence class containing) $A_2$.

For example, if a call bar (h2) is added to method Example.main( ), the choice of: (i) customizing both H2 and H3 or (ii) not customizing both H2 and H3 is possible.

However, customizing H2 but not H3 (or vice versa) will not preserve the behavior of cast C1.

However, a solution is guaranteed to exist in which type CustomC is selected for all equivalence classes E such that CustomC$\in S_E$.

A more precise treatment of these properties is currently in progress.

Pragmatic Issues

There are several issues that require straightforward extensions to the basic approach. These include the treatment of subtypes of standard container classes (e.g., an application declaring a class MyHashtable that extends Hashtable), and limiting the introduction of custom container classes in the presence of serialization. Space limitations prevent us from providing more details.

Further Customization

Thus far, presented is how variables and allocation sites of type C can be updated to refer to type CustomC. At this point it has become easy to replace CustomC with a small hierarchy of custom classes such as the one shown in FIG. 2 by applying refactorings (For more general information, please see Fowler, M. *Refactoring. Improving the Design of Existing Code*. Addison-Wesley, 1999) as follows:

Split class CustomC into an abstract superclass AbstractCustomC and a concrete subclass CustomC. All declarations and casts (but not allocation sites) that refer to type CustomC are made to refer to AbstractCustomC instead.

At this point, clones $CustomC_1, \ldots, CustomC_n$ of class CustomC can be introduced as a subclass of AbstractCustomC. Any allocation site of type CustomC may be updated to refer to any $CustomC_i$.

In Section Implementation, discussed is a number of optimizations that can be (independently) applied to each $CustomC_i$.

Implementation

Static Analysis

In this embodiment, Gnosis is used as a framework for interprocedural context-sensitive analysis that was developed at IBM Research for gathering points-to information and call graph information. The latter is used for determining unreachable methods in container classes on a per-allocation-site basis. A standard context-insensitive analysis is adapted in Gnosis so that it computes what amounts to the transitive closure of the type constraints described above. Two non-standard components of the analysis are:

For the set of customizable classes, each allocation site in user code is separately analyzed, but a single logical allocation site is used representing all allocations in system code.

Analysis is done in two passes: a conventional points-to analysis is followed by a step in which additional data flow facts are introduced that model the type constraints associated with method overriding, similar in spirit to Glew, N., and Palsberg, J. Type-safe method inlining. In *Proc. 16th European Conf. On Object-Oriented Programming* (2002), pp. 525-544, which is hereby incorporated by reference in its entirety. ((For more general information, please see Rountev, A., Milanova, A., and Ryder, B. Points-to analysis for Java using annotated constraints. In *Proc. 16th Annual Conf. on Object-Oriented Programming Systems, Languages, and Applications* (*OOPSLA* '01) (Tampa Bay, Fla., 2001), pp. 43-55; Hind, M., and Pioli, A. Evaluating the effectiveness of pointer alias analysis. *Science of Computer Programming* 39, 1 (2001), 31-55; and, for more information, please see Ryder, B. G. Dimensions of precision in reference analysis of object-oriented programming languages. In *Proc. 12th International Conf. on Compiler Construction* (*CC* 2003) (Warsaw, Poland, April 2003), pp. 126-137, each reference is hereby incorporated by reference in its entirety.

Like many static whole-program analysis and transformation tools, Gnosis relies on the user to specify the behaviors of native methods (in the standard libraries) as well as any uses of reflection in order to compute a safe analysis result. (For more general information, please see Tip, F., Sweeney, P. F., Laffra, C., Eisma, A., and Streeter, D. Practical extraction techniques for Java. *ACM Trans. on Programming Languages and Systems* 24, 6 (2002), 625-666, which is hereby incorporated by reference in its entirety.)

Instrumentation

A profile-driven approach is used for determining customizations that are likely to improve performance. Existing profiling tools for object-oriented languages such as JInsight (For more general information, please see DePauw, W., Jensen, E., Mitchell, N., G. Sevitsky, J. V., and Yang, J. Visualizing the execution of Java programs. In *Software Visualization* (Dagstuhl, Germany, May 2001), pp. 151-162. Springer LNCS 2269) tend to generate profile-information for all objects created by an application. The main disadvantages of using off-the-shelf profiling tools are: (i) that the generated trace files quickly become very large, (ii) that not all the information needed is readily available (e.g., information associated with the simulation of various caching strategies), and (iii) that the profiling information is not readily available in a form suitable for automated decision making. Therefore, an approach was pursued where the customization framework itself is used to replace the standard containers created by an application with custom versions that gather profile information. This is subject to the usual limitations. In other words, profile information is gathered for container objects that are passed to/from the standard libraries.

Since all objects allocated at a customizable allocation site will be of the same custom type in the customized program, usage statistics per allocation site is collected. Therefore, each profiling container object needs to keep track of where it was allocated. The statistics that are collected per container allocation site include:

1. A distribution of the construction-time sizes.
2. A distribution of the high-watermarks of the sizes of the container objects allocated at the site (i.e., the largest size of containers during their life-time).
3. Distributions of the container's size at method invocations (per method).
4. The hit-rates of search operations.
5. The hit-rates of several caching schemes that might optimize search operations.

Distributions (1) and (2) are used as a basis for deciding on an initial allocation size and on lazy vs. eager allocation. Combined with (3), they are also used to determine whether providing special treatment for singleton containers is beneficial. Distribution (3) is also used to determine whether or not to optimize certain methods for specific sizes, such as empty or singleton containers. Distribution (4) is used to decide on whether or not search methods are to be optimized for succeeding or failing searches. Finally, (5) is used to decide on caching schemes. In the present invention, optimization decisions are based on thresholds, such as hit-rates for search operations, cache schemes, fractions of containers that remain empty or singletons, etc. All thresholds used are very high. For example, a lazy allocation is used if 75% of the allocated containers remain empty or contain only one item. Similarly, caching schemes are used only if their hit-rates are 90% or higher.

Implemented Optimizations

The optimizations implemented include:

1. Caching the last retrieved items in a container using different caching schemes.

2. Lazy allocation of encapsulated data structures such as a Hashtable's array of hash-buckets, 3. Selecting a non-default initial size and growth-strategy for a container's underlying data structures, depending on the success-rate of retrieval operations, the distribution of the high-watermarks of the container sizes, etc.

4. Implementing corner cases efficiently if they appear frequently, including empty containers and containers containing one element only. An example is the use of a single empty container enumerator object whose hasMoreElements( ) method always returns false.

5. Transforming instance fields into class fields if their values are identical for all objects allocated at some allocation site, or if the differences are non-critical.

6. Optimization of the container for the type of objects stored in them, if static analysis can determine these types. Examples of such optimizations are Integers keys in Hashtables, for which the int values instead are stored, or Strings of which can exploit the fact that their hashcodes are cached.

7. Removal of superfluous bookkeeping code and fields such as those used for implementing fail-fast iterators.

8. Finalizing classes that have no subtypes in the program.

Code Generation

Java bytecode is generated (For more general information, please see Lindholm, T., and Yellin, F. *The Java Virtual Machine Specification*. Addison-Wesley, 1997) by preprocessing a template implementation of a Java container class, and compiling the resulting source files to Java class files. In the present invention implementation, this is done using the standard C-preprocessor. While perhaps not optimal in terms of flexibility and maintainability, the use of the C-preprocessor has the advantage that some of the decision logic can be incorporated in the templates, by nesting #ifdef, #ifndef and #define statements.

In addition to the profiling statistics discussed in Section Instrumentation above, static analysis information is used to detect situations where certain methods are never invoked on a container object that originates from a given allocation site A. This information is used to remove methods and fields from the custom class used at A. The bookkeeping fields used for implementing fail-fast iterators are an example of a situation where this is useful. Other optimizations that rely on static analysis information are the specialization of a container's element type, and finalization of a containers methods and fields.

JikesBT (See online URL alphaworks.ibm.com/tech/jikesbt) is used, a byte-code instrumentation tool developed at IBM Research for the rewriting of the application's class files so that they refer to the generated custom container classes.

Experimental Evaluation

To evaluate our techniques, the execution times were measured of a
number of customized programs on an IBM NetVista workstation
(Pentium 4 at 1.8 GHz, 1 GB RAM) running Windows 2000 SP3 and two Java virtual machines:

(i) Sun JVM 1.3.1 is the Sun Java HotSpot™ Client VM, build 1.3.1_09-b01, (ii) j9 is a development version of IBM's "J9" VM distributed with WebSphere Device Developer, build 20030313.

All measurements were performed using the default settings for each virtual machine.

One evaluation of the present invention requires that standard containers and custom containers are derived from the same source code base. Since only access to library source code of j9 was available, used was j9's collection libraries by prepending them to the bootclasspath for both VMs.

For experiments in the present invention all program versions were run five times, and the averages reported. With the exception of HyperJ, for which only one input data set was available, all measurements were performed using larger data sets than the training sets used to collect profile information.

For each program, a measure of execution times for three versions was performed. The execution times of the original programs, using standard container classes only, are denoted $P_o$ in Table 1 as shown in FIG. 10. The execution times of the versions using custom classes are denoted $P_c$. In addition to the original and the custom versions, run also was an untuned version, denoted as $P_u$, which uses standard container classes but that ignores initialization parameters that were explicitly provided by programmers. This enables us to approximate how much speed-up was already achieved by supplying construction time parameters. The speed-ups presented for customization are achieved on top of this.

The benchmark programs are listed in Table 2, which also lists the applied customizations. Three of the benchmark programs are taken from the SPECjvm98 suite: _202_jess is an expert shell system, _209_db is a memory resident database, and _218_jack is parser generator. The other benchmarks included are HyperJ (an aspect-oriented development tool), Jax (For more general information, please see Tip, F., Sweeney, P. F., Laffra, C., Eisma, A., and Streeter, D. Practical extraction techniques for Java. *ACM Trans. on Programming Languages and Systems* 24, 6 (2002), 625-666), and PmD (a tool for detecting programming errors available from SourceForge).

Results are shown in Table 1. An analysis of the obtained results and applied customizations reveals that:

In _202_jess, the keys used in hashtables are either Strings or Integers, and on 2 of the hashtables all search operations fail. Customization results in 6-8% speed-ups, depending on the JVM used.

In _209_db, 99% of all consecutive retrieval operations on Vectors retrieve the same element, and the application of a caching scheme results in an 18% speedup on the Sun VM.

In _228_jack, 99% of all search operations are on empty hashtables, or hashtables containing one element only. Optimizing this corner case results in speed-ups ranging from 8 to 9%, depending on the VM.

In HyperJ, the same situation occurs, and lazy allocation for the hot allocation sites results in speedups ranging from 7 to 14%.

In Jax, most containers remain very small, and adapting the initial container size to reflect that results in speedups ranging between 0 and 3%.

In PmD, the vast majority of the huge number of allocated HashMaps remains empty or contains only one element. Lazy allocation and the optimization of access methods results in speedups of 6%.

The raw execution times shown in Table 1 indicate that the 2 (Virtual Machines (VMs)) have somewhat different performance characteristics. It is therefore no surprise that the obtained speedups are different for each VM as well. This indicates that the decision logic used for the customization should be made parametrizable for specific VMs.

Related Work

Yellin, and Högstedt et al discuss techniques for automatically selecting optimal component implementations. (For more information, please see Yellin, D. Competitive algorithms for the dynamic selection of component implementations. *IBM Systems Journal* 42, 1 (January, 2003), 85-97, and Högstedt, K., D., K., Rajan, V., Roth, T., Sreedhar, V., Wegman, M., and Wang, N. The autonomic performance prescription). Each reference is hereby incorporated by reference in its entirety.) In Yellin's work, selection takes place at run-time, and based on on-line profiling only, while in the work by Högstedt et al., off-line profiling is used as well. Both techniques require the component developer to provide all versions of the components up front, thus making them less viable when many orthogonal implementation decisions have to be made, as is the case in the present invention. Unlike the present invention, the approaches of Yellin and Högstedt et al. do not require static analysis because programs are correct by construction. In the present invention, static analysis is used to guarantee type-correctness in cases where container objects are exchanged with the standard libraries (or other components). Moreover, as the approaches of Yellin and Högstedt et al are profile-guided and do not rely on static analysis, they are incapable of eliminating functionality from container classes.

Schonberg et al. discuss techniques for automatically selecting the underlying data structures in SETL programs. (For more information, please see Schonberg, E., Schwartz, J., and Sharir, M. An automatic technique for selection of data representations in SETL programs. *ACM Trans. On Programming Languages and Systems* 3, 2 (April 1981), 126-143. Each reference is hereby incorporated by reference in its entirety.) In this approach, collections are described at the source code level in terms of abstract data types such as sets and maps. An optimizing compiler selects a corresponding nonabstract data structure from a predetermined collection of concrete datatypes that has been provided in advance (e.g., linked lists, hashtables, and bit-vectors are used to represent sets). The selection of concrete representations is based on the fact whether or not sets are iterated over, and on the fact whether or not a set is involved in set-theoretic operations.

Transformational programming is a programming methodology based on top-down stepwise program refinement. ((For more information, please see Paige, R. Transformational programming: applications to algorithms and systems. In *Proc. 10$^{th}$ ACM SIGACT-SIGPLAN Symp. On Principals of programming languages* (1983), pp. 73-87, which is hereby incorporated by reference in its entirety.) It allows the programmer to specify his program in terms of very high-level constructs without the need to worry about efficiency. By automatically applying a sequence of finite difference transformations, or doing incremental refinement, an initial program is transformed into a more efficient one. (For more information, please see Pavlovic, D. and Smith, D. Software development by refinement. In *UNU/IIST 10$^{th}$ Anniversary Colloquim, Formal Methods at Crossroads: From Panacea to Foundational Support*. Springer-Verlag, 2003; Cai, J., and Paige, R. Towards increased productivity of algorithm implementation. In *Proc. 1$^{st}$ ACM SIGSOFT symph. On Foundations of software engineering* (1993), pp. 71-78; and Dewar, R. K., Arthur, Liu, S.-C., Schwartz, J. T., and Schonberg, E. Programming by refinement, as exemplified by the SETL representation sublanguage. *ACM Trans. On Programming Languages and Systems (TOPLAS)* 1, 1 (1979), 27-49, each reference which is hereby incorporated by reference in its entirety.)

There is a large body of work on automatic optimization of data structures in specific domains such as data structures used in linear algebra kernels. For example, the Berkeley Benchmarking and Optimization Group available online URL bebop.cs.berkeley.edu studies issues related to optimization and data structure selection for sparse matrix multiplication problems.

In the same domain, Yotov et al. conduct a comparison of empirical and model-driven approaches for selecting customized data structures. (For more general information, please see Yotov, K., Li, X., Ren, G., Cibulskis, M., DeJong, G., Garzaran, M., Padua, D., Pingali, K., Stodghill, P., and Wu, P. A comparison of empirical and model-driven optimization. In *Proc. ACM SIGPLAN 2003 Conf. on Programming Language Design and Implementation* (2003), pp. 63-76., which is hereby incorporated by reference in its entirety.)

There is also some work on optimizations that can be applied to specific containers such as hashtables. For example, Beckmann and Wang (For more general information, please see Beckman, B. and Wang, X. Adaptive prefetching Java objects. Manuscript.) discuss the optimization of hashtables by prefetching the objects that are most likely to be searched for in the containers, and Friedman et al. (For more information, please see Friedman, S., Leidenfrost, N., Brodie, B., and Cytron, R. Hashtables for embedded and real-time systems. In *IEEE Real-Time Embedded System Workshop* (2001), which is hereby incorporated by reference in its entirety.) discuss the optimization of the maximal access time of hashtables to improve real-time behavior by, e.g., incrementalizing rehash operations.

Type constraints were originally introduced (For more information, please see Palsberg, J. and Schwartzbach, M. *Object-Oriented Tape Systems*. John Wiley & Sons, 1993, which is hereby incorporated by reference in its entirety.) as a means to check whether a program conforms to a language's type system. If a program satisfies all type constraints, no type violations occur at run-time (e.g., no method m( . . . ) is invoked on an object whose class does not define or inherit m( . . . )). Tip et al. (For more information, please see Tip, F., Kiežun, A., and Bäumer, D. Refactoring for generalizations using type constraints. In *Proc. 18$^{th}$ Annual Conf. on Object-Oriented Programming Systems, Languages, and Applications (OOPSLA '03)*, which is hereby incorporated by reference in its entirety.) recently used type constraints for checking the preconditions and determining the allowable source-code modifications associated with generalization-related refactorings. The problem of determining references to standard container classes that may be replaced with references to custom container classes is very similar to the problem of determining declarations that may be updated when the Extract Interface refactoring is applied.

Non-Limiting Hardware Embodiments

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system to read data, instructions, messages or message packets, and other computer readable information from the computer readable medium. The computer readable medium may include non-volatile memory, such as ROM, flash memory, disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

Figure 12:
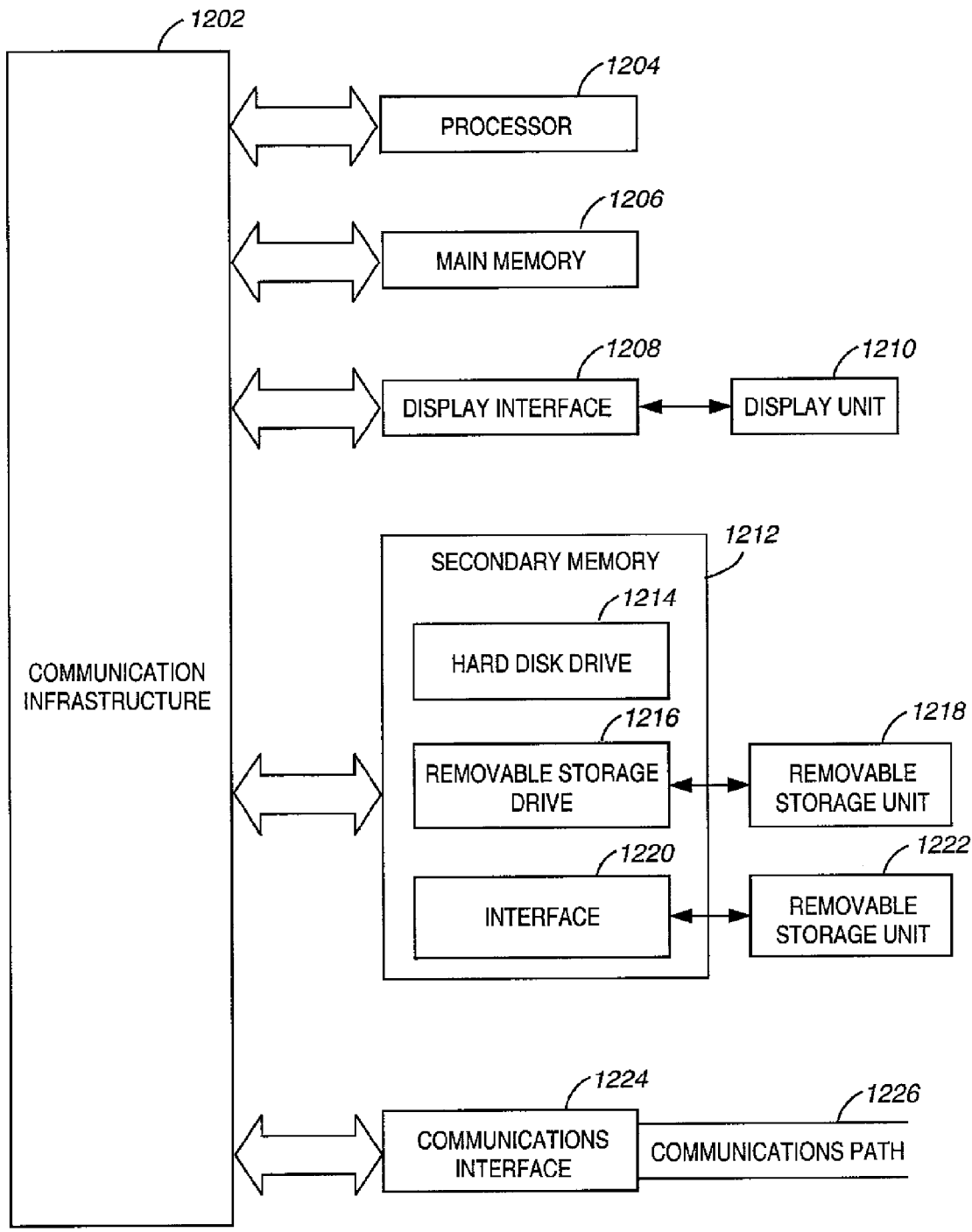
FIG. 12 is a block diagram of a computer system useful for implementing the software steps of the present invention.

An example of a computer system 1200 is shown in FIG. 12. The computer system 1200 includes one or more processors, such as processor 1204. The processor 1204 is connected to a communication infrastructure 1202 such as a communications bus, crossover bar, or network. Various software embodiments are described in terms of this exemplary computer system. After reading this description, it will become apparent to a person of ordinary skill in the relevant art(s) how to implement the invention using other computer systems and/or computer architectures.

Computer system 1200 includes a display interface 1208 that forwards graphics, text, and other data from the communication infrastructure 1202 (or from a frame buffer not shown) for display on the display unit 1210. Computer system 1200 also includes a main memory 1206, preferably random access memory (RAM), and optionally includes a secondary memory 1212. The secondary memory 1212 includes, for example, a hard disk drive 1214 and/or a removable storage drive 1216, representing a floppy disk drive, a magnetic tape drive, an optical disk drive, etc. The removable storage drive 1216 reads from and/or writes to a removable storage unit 1218 in a manner well known to those having ordinary skill in the art. Removable storage unit 1218, represents a floppy disk, magnetic tape, optical disk, etc. which is read by and written to by removable storage drive 1216. As will be appreciated, the removable storage unit 1218 includes a computer usable storage medium having stored therein computer software and/or data.

In alternative embodiments, the secondary memory 1212 includes other similar means for allowing computer programs or other instructions to be loaded into computer system 1200. Such means include, for example, a removable storage unit 1222 and an interface 1220. Examples of such include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 also optionally includes a communications interface 1224. Communications interface 1224 allows software and data to be transferred between computer system 1200 and external devices. Examples of communications interface 1224 include a modem, a network interface (such as an Ethernet card), a communications port, a PCM-CIA slot and card, etc. Software and data transferred via communications interface 1224 are in the form of signals which may be, for example, electronic, electromagnetic, optical, or other signals capable of being received by communications interface 1224. These signals are provided to communications interface 1224 via a communications path (i.e., channel) 1226. This channel 1226 carries signals and is implemented using wire or cable, fiber optics, a phone line, a cellular phone link, an RF link, and/or other communications channels.

The terms "computer program medium," "computer usable medium," and "computer readable medium" are used to generally refer to media such as main memory 1206 and secondary memory 1212, removable storage drive 1216, a hard disk installed in hard disk drive 1214, and signals. These computer program products are means for providing software and/or image data to computer system 1200. The computer readable medium allows the computer system 1200 to read data, instructions, messages or message packets, and other computer readable information from the computer readable medium. The computer readable medium, for example, includes non-volatile memory, such as Floppy, ROM, flash memory, disk drive memory, CD-ROM, and other permanent storage. It is useful, for example, for transporting information, such as data and computer instructions, between computer systems 1200. Furthermore, the computer readable medium comprises computer readable information in a transitory state medium such as a network link and/or a network interface, including a wired network or a wireless network, that allow a computer to read such computer readable information.

Computer programs (also called computer control logic) are stored in main memory 1206 and/or secondary memory 1212. Computer programs are also received via communications interface 1224. Such computer programs, when executed, enable the computer system 1200 to perform the features of the present invention as discussed herein. In particular, the computer programs, when executed, enable the processor 1204 to perform the features of the computer system 1200. Accordingly, such computer programs represent controllers of the computer system 1200.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

CONCLUSIONS

Presented was an automated approach for customizing classes that relies on static analysis for determining where custom classes may be introduced in an application, and on profile information for determining what optimizations are likely to be profitable. The approach was evaluated by creating customizations of the standard Java container classes in the context of a set of Java benchmark applications, and speedups of up to 18% were measured. The automated customization techniques in the present invention are useful in application extractors and whole-program optimizers.

It is important to note that to those of average skill in the art, other implementations are possible with a more precise formal treatment of the properties of the present invention for determining where custom allocation sites may be introduced. Other topics for future work include more advanced program transformations (e.g., replacing a Hashtable with an extra field in each key object that refers to its corresponding value), and the use of escape analysis to determine where unnecessary synchronizations can be removed from synchronized container classes.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A computer readable storage medium containing programming instructions for automatic replacement of object classes, the programming instructions comprising:
    performing static analysis on a program containing a plurality of objects in order to determine constraints on transformations that can be applied and to detect unused functionality in one or more of the objects to be replaced;
    analyzing the plurality of objects to detect usage patterns of functionality in the one or more objects replaced;
    analyzing at least one execution of the program to collect profile information for the one or more objects; and
    generating customized classes based upon the static analysis and the usage patterns detected and the profile information which has been collected;
    wherein the generating customized classes based upon the usage patterns detected includes:
        identifying a customizable container class C with superclass B;
        creating a class CustomC which contains methods and fields that are identical to those in class C, wherein if B is not customizable, then CustomC's superclass is B, otherwise CustomC's superclass is CustomB;
        introducing a type $C^T$, and making both C and CustomC a subtype of $C^T$ and wherein type $C^T$ contains declarations of all methods in C that are not declared in any superclass of C; and
        introducing a type $C^\perp$, and making $C^\perp$ a subclass of both C and CustomC, wherein type $C^\perp$ contains no methods, and wherein $C^T$ and $C^\perp$ are intermediate types not provided as output during the generating of custom classes;
        determining at least one equivalence class E of declaration elements and expressions that must have a same type.

2. The computer readable storage medium according to claim 1, wherein the performing static analysis on a program containing a plurality of objects in order to determine constraints includes determining constraints which are type constraints.

3. The computer readable storage medium according to claim 1, wherein the plurality of objects is a plurality of container objects.

4. The computer readable storage medium according to claim 1, wherein the analyzing the plurality of objects includes instrumenting the plurality of objects to detect usage patterns of functionality in the one or more objects replaced.

5. The computer readable storage medium according to claim 1, further comprising rewriting bytecode of an application to use the generated classes while providing transparency in the program during the replacement of the objects.

6. The computer readable storage medium according to claim 1, wherein the performing static analysis further comprises performing static analysis to determine constraints by determining if a type of in one or more objects to be replaced is a supertype of a type referenced in a cast expression.

7. The computer readable storage medium according to claim 1, wherein the performing static analysis further comprises performing static analysis to determine type-correctness constraints by determining if a type of in one or more objects to be replaced is a supertype of a type referenced in a cast expression.

8. The computer readable storage medium according to claim 1, wherein the performing static analysis further comprises performing static analysis to determine interface-compatibility constraints in one or more of the objects to be replaced.

9. The computer readable storage medium according to claim 1, wherein the performing static analysis further comprises performing static analysis to preserve run-time behavior for casts and instance of operations for one or more of the objects to be replaced.

10. The computer readable storage medium according to claim 1, wherein the performing static analysis includes using points-to-analysis to determine where references to classes in allocation sites, declarations, casts and instanceof-expressions are modifiable to refer to one or more of the objects to be replaced.

11. The computer readable storage medium according to claim 1, wherein the performing static analysis includes using points-to analysis to determine where references to container classes in allocation sites, declarations, casts and instanceof-expressions are modifiable to refer to one or more of the objects to be replaced.

12. The computer readable storage medium according to claim 1, wherein the generating customized classes does not require a programmer to supply any additional types and additional external declarations for the customized classes.

13. The computer readable storage medium according to claim 1, wherein the generating of customized classes based upon the usage patterns detected includes:
    computing a set of possible types for equivalence class E using an optimistic algorithm, wherein this algorithm associates a set $S_E$ of types with equivalence class E, which is initialized as follows:
    associating a set $S_E$ with the equivalence class E containing the types C and CustomC if E contains an allocation site expression new C; and
    associating a set $S_E$ with the equivalence class E containing all types except auxiliary types $C^T$ and $C^\perp$, wherein $C^T$ and $C^\perp$ are intermediate types not provided as output during the generation of custom classes if E does not contain any allocation site expressions.

14. The computer readable storage medium according to claim 13, further comprising:
    identifying sets $S_D$ and $S_E$ for each pair of equivalence classes D, E such that there exists a type constraint $D \leq E$;
    removing from set $S_D$ any type that is not a subtype of a type that occurs in $S_E$; and
    removing from set $S_E$ any type that is not a supertype of a type that occurs in $S_D$.

wherein the removing of $S_D$ and $S_E$ is performed repeatedly until a fixed point is reached.

15. An information processing system with programming instructions for automatic replacement of object classes, comprising:

means for performing static analysis on a program containing a plurality of objects in order to determine constraints on transformations that can be applied and to detect unused functionality in one or more of the objects to be replaced;

means for analyzing the plurality of objects to detect usage patterns of functionality in the one or more objects replaced;

means for analyzing at least one execution of the program to collect profile information for the one or more objects; and means for generating customized classes based upon the static analysis and the usage patterns detected and the profile information which has been collected;

wherein the means for generation of customized classes based upon the usage patterns detected includes:

means for identifying a customizable container class C with superclass B;

means for creating a class CustomC which contains methods and fields that are identical to those in class C, wherein if B is not customizable, then CustomC's superclass is B, otherwise CustomC's superclass is Custom B;

means for introducing a type $C^T$, and making both C and CustomC a subtype of $C^T$ and wherein type $C^T$ contains declarations of all methods in C that are not declared in any superclass of C; and means for introducing a type $C^\perp$, and making $C^\perp$ a subclass of both C and CustomC, wherein type $C^\perp$ contains no methods, and wherein $C^T$ and $C^\perp$ are intermediate types not provided as output during the generating of custom classes; and means for determining at least one equivalence class E of declaration elements and expressions that must have a same type.

16. The information processing system according to claim 15, wherein the means for performing static analysis on a program containing a plurality of objects in order to determine constraints includes determining constraints which are type constraints.

17. The information processing system according to claim 15, wherein the means the plurality of objects is a plurality of container objects.

18. The information processing system according to claim 15, wherein the means for analyzing the plurality of objects includes instrumenting the plurality of objects to detect usage patterns of functionality in the one or more objects replaced.

19. The information processing system according to claim 15, further comprising means for rewriting bytecode of an application to use the generated classes while providing transparency in the program during the replacement of the objects.

20. The information processing system according to claim 15, wherein the means of generating of customized classes based upon the usage patterns detected includes:

means for computing a set of possible types for equivalence class E using an optimistic algorithm, wherein this algorithm associates a set $S_E$ of types with equivalence class E, which is initialized as follows:

means for associating a set $S_E$ with the equivalence class E containing types C and CustomC if E contains an allocation site expression new C; and means for associating a set $S_E$ with the equivalence class E containing all types except auxiliary types $C^T$ and $C^\perp$, wherein $C^T$ and $C^\perp$ are intermediate types not provided as output during the generation of custom classes if E does not contain any allocation site expressions.

* * * * *